United States Patent [19]

Hiraoka et al.

[11] Patent Number: 5,260,044

[45] Date of Patent: Nov. 9, 1993

[54] METHOD FOR REMOVING ORGANIC CHLORINE COMPOUNDS FROM COMBUSTION WASTE GAS

[75] Inventors: Masakatsu Hiraoka, 39-763, Kohata Okurayama, Uji-shi, Kyoto; Toshihiko Iwasaki, Tokyo; Haruhito Tsuboi, Tokyo; Takashi Noto, Tokyo; Miki Yamagishi, Tokyo; Takashi Yokoyama, Tokyo; Yasuo Suzuki, Tokyo; Yoshinori Imoto, Nagoya; Katsunosuke Hara, Kariya; Osamu Ishikawa, Handa, all of Japan

[73] Assignees: Masakatsu Hiraoka, Kyoto; NKK Corporation, Tokyo; NGK Insulators, Ltd., Aichi, all of Japan

[21] Appl. No.: 848,974

[22] PCT Filed: Sep. 5, 1991

[86] PCT No.: PCT/JP91/01186

§ 371 Date: Apr. 15, 1992

§ 102(e) Date: Apr. 15, 1992

[87] PCT Pub. No.: WO92/04104

PCT Pub. Date: Mar. 19, 1992

[30] Foreign Application Priority Data

Sep. 6, 1990 [JP] Japan .................................. 2-236195

[51] Int. Cl.$^5$ .......................... C01B 7/01; C01B 3/22
[52] U.S. Cl. .......................... 423/240 S; 588/206; 588/207; 423/245.3
[58] Field of Search .............. 423/240 S, 240 R, 245.3; 588/206, 205, 207; 208/262.5

[56] References Cited

U.S. PATENT DOCUMENTS

| | | | |
|---|---|---|---|
| 3,845,191 | 10/1974 | Bruce, Jr. ................ | 423/240 R |
| 4,957,717 | 9/1990 | Imamura et al. ............. | 423/240 S |
| 4,983,366 | 1/1991 | Deller et al. ............... | 423/240 S |
| 5,098,687 | 3/1992 | Skeels et al. .............. | 502/79 |

FOREIGN PATENT DOCUMENTS 0387417 9/1990 European Pat. Off. .
0402122 12/1990 European Pat. Off. .

Primary Examiner—Michael Lewis
Assistant Examiner—Stephen G. Kacinchaic
Attorney, Agent, or Firm—Frishauf, Holtz, Goodman & Woodward

[57] ABSTRACT

A method for removing detrimental organic chlorine compounds such as polychlorinated dibenzo-p-dioxins and polychlorinated dibenzofurans from a combustion waste gas, which comprises the steps of: bringing organic chlorine compounds contained in a combustion waste gas at a temperature within a range of from 150° to 350° C. into contact with a catalyst comprising at least one selected from the group consisting of platinum, palladium, ruthenium, manganese, copper, chromium and iron and oxides thereof, which catalyst is supported on the surface of a carrier containing at least titanium oxide, Aluminum oxide and silicon oxide, to cause a decomposition reaction of the organic chlorine compounds, thereby removing organic chlorine compounds from the combustion waste gas at a high efficiency.

17 Claims, 1 Drawing Sheet

METHOD FOR REMOVING ORGANIC CHLORINE COMPOUNDS FROM COMBUSTION WASTE GAS

FIELD OF THE INVENTION

The present invention relates to a method for removing, from a combustion waste gas discharged from an incinerator, detrimental organic chlorine compounds such as polychlorinated dibenzo-p-dioxins and polychlorinated dibenzofurans contained in the combustion waste gas.

BACKGROUND OF THE INVENTION

As to methods for removing detrimental substances such as sulfur oxide, nitrogen oxide, hydrogen chloride and cyanogen contained in a combustion waste gas produced from an incinerator, for example, for incinerating industrial and household wastes, many research reports have so far been released, and some of them have already been industrialized.

However, research efforts have been started only recently as to methods for removing, from the above-mentioned combustion waste gas, organic chlorine compounds, though slight in amount, having a strong toxicity, such as polychlorinated dibenzo-p-dioxins, polychlorinated dibenzofurans, polychlorinated biphenyl and chlorophenol contained in the combustion waste gas. A method for removing such organic chlorine compounds from the combustion waste gas in an industrial scale has not therefore as yet been established.

Polychlorinated dibenzo-p-dioxins and polychlorinated dibenzofurans are stable substances and are insoluble in water, so that the toxicity thereof is semi-permanently retained. In particular, polychlorinated dibenzo-p-dioxins and polychlorinated dibenzofurans are very detrimental substances which pollute the environment by their strong toxicity.

Polychlorinated dibenzo-p-dioxins are classified, in terms of the number of chlorines, into dichloride, tetrachloride, pentachloride and hexachloride, and there are more than 70 types of isomers. Among these polychlorinated dibenzo-p-dioxins, tetrachlorinated dibenzo-p-dioxin has the strongest toxicity.

For the purpose of removing detrimental organic chlorine compounds such as polychlorinated dibenzo-p-dioxins and polychlorinated dibenzofurans from a combustion waste gas discharged from an incinerator, the following methods are known:

(1) Removing method based on combustion:
This method comprises the steps of: increasing the temperature in an incinerator to at least 1,000° C., and causing a decomposition reaction of organic chlorine compounds contained in a combustion waste gas under the effect of this high temperature, thereby removing the organic chlorine compounds from the combustion waste gas.

An alternative method comprises the steps of: introducing a combustion waste gas discharged from an incinerator into another combustion furnace, and causing a decomposition reaction of organic chlorine compounds contained in the combustion waste gas at a temperature of at least 1,000° C., thereby removing the organic chlorine compounds from the combustion waste gas.

(2) Removing method based on adsorption:
This method comprises the steps of: passing a combustion waste gas discharged from an incinerator through an adsorbent such as activated charcoal and causing the adsorption by the adsorbent of organic chlorine compounds contained in the combustion waste gas for removal.

(3) Removing method based on washing:
This method comprises the step of: washing with a chemical solution a combustion waste gas discharged from an incinerator to remove organic chlorine compounds contained in the combustion waste gas.

The removing method based on combustion mentioned in (1) above has the following problems:

(a) In order to remove organic chlorine compounds from the combustion waste gas in the incinerator, it is necessary to increase the temperature in the incinerator to at least 1,000° C. Usually, however, the temperature in the incinerator is within a range of from about 800° to about 900° C. In order to increase the temperature in the incinerator to at least 1,000° C., therefore, it is necessary to totally reconstruct the incinerator.

(b) Most of the incinerators currently in use are stoker furnaces, and low-temperature portions may easily be locally produced in such a stoker furnace. It is therefore difficult to increase the temperature in the furnace to at least 1,000° C. throughout the entire furnace interior (c) Increasing the temperature in the incinerator may easily damage the furnace wall as a result of melting of ash in the incinerated product.

(d) Installation of another combustion furnace for removing the organic chlorine compounds from the combustion waste gas requires higher equipment and running costs. Furthermore, the low contents of the organic chlorine compounds in the combustion waste gas lead to a low removing efficiency of the organic chlorine compounds.

The removing method based on adsorption mentioned in (2) above has the following problem:

(a) It is necessary to take a measure for regenerating the adsorbent such as activated charcoal after adsorbing the organic chlorine compounds.

The removing method based on washing mentioned in (3) above has the following problem:

(a) It is necessary to take a measure for eliminating toxicity of the waste liquid after washing the combustion waste gas.

As a method for solving the above-mentioned problems, Japanese Patent Provisional Publication No. 63-290,314 dated Nov. 28, 1988 discloses a method for removing organic chlorine compounds from a combustion waste gas discharged from an incinerator, which comprises the step of:

bringing organic chlorine compounds contained in a combustion waste gas discharged from an incinerator into contact with a catalyst comprising platinum supported on the surface of a carrier made of ceramics at a temperature within a range of from 300° to 900° C. to cause a decomposition reaction of the organic chlorine compounds, thereby removing the organic chlorine compounds from the combustion waste gas (hereinafter referred to as the "prior art 1").

Japanese Patent Provisional Publication No. 2-35,914 dated Feb. 6, 1990 discloses a method for removing organic chlorine compounds from a combustion waste gas discharged from an incinerator, which comprises the step of:

bringing organic chlorine compounds contained in a combustion waste gas discharged from an incinerator and having a temperature of at least 150° C. into contact with a catalyst comprising at least one selected from the group consisting of titanium oxide, vanadium oxide, tungsten oxide, platinum and palladium to cause a decomposition reaction of the organic chlorine compounds, thereby removing the organic chlorine compounds from the combustion waste gas (hereinafter referred to as the "prior art 2").

The above-mentioned prior art 1 has the following problems: In the prior art 1, it is necessary to bring the combustion waste gas into contact with the catalyst at a high temperature within the range of from 300° to 900° C. The waste gas discharged from the incinerator and subjected to dust collection through a dust collector has usually a temperature of up to 350° C. In the prior art 1, therefore, it is necessary in most cases to heat the combustion waste gas to the above-mentioned high temperature, thus requiring a heating equipment of the combustion waste gas. This results in higher equipment and running costs. Because of the easy deterioration of the catalyst under the effect of the high-temperature combustion waste gas, furthermore, it is impossible to remove the organic chlorine compounds from the combustion waste gas stably for a long period of time.

The above-mentioned prior art 2 has the following problem; The prior art 2 gives a removing ratio of polychlorinated dibenzo-p-dioxins from the combustion waste gas within a range of from about 22 to 38%, and a removing ratio of polychlorinated dibenzofurans from the combustion waste gas within a range of from about 46 to 49%. In the prior art 2, therefore, the removing ratios of polychlorinated dibenzo-p-dioxins and polychlorinated dibenzofurans are low.

Under such circumstances, there is a strong demand for the development of a method which permits removing detrimental organic chlorine compounds such as polychlorinated dibenzo-p-dioxins and polychlorinated dibenzofurans contained in a combustion waste gas discharged from an incinerator at a high efficiency and stably for a long period of time by means of a catalyst without heating the combustion waste gas, but such a method has not as yet been proposed.

An object of the present invention is therefore to provide a method which permits removing detrimental organic chlorine compounds such as polychlorinated dibenzo-p-dioxins and polychlorinated dibenzofurans contained in a combustion waste gas discharged from an incinerator at a high efficiency and stably for a long period of time by means of a catalyst, without heating the combustion waste gas.

SUMMARY OF THE INVENTION

In accordance with one of the features of the present invention, there is provided, in a method for removing organic chlorine compounds from a combustion waste gas, which comprises the steps of:

bringing organic chlorine compounds contained in a combustion waste gas at a prescribed temperature into contact with a catalyst to cause a decomposition reaction of said organic chlorine compounds, thereby removing said organic chlorine compounds from said combustion waste gas;

the improvement, wherein:

said catalyst comprises at least one selected from the group consisting of platinum (Pt), palladium (Pd), ruthenium (Ru), manganese (Mn), copper (Cu), chromium (Cr) and iron (Fe) and oxides thereof; said catalyst is supported on the surface of a carrier containing at least titanium oxide ($TiO_2$), aluminum oxide ($Al_2O_3$) and silicon oxide ($SiO_2$); and said prescribed temperature of said combustion waste gas is within a range of from 150° to 350° C.

DETAILED DESCRIPTION OF PREFERRED EMBODIMENTS

Figure 1:
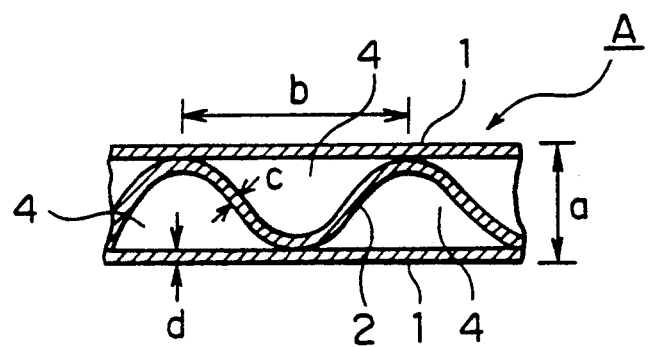
FIG. 1 is a schematic partial sectional view illustrating a typical carrier used in the method of the present invention.

From the above-mentioned point of view, extensive studies were carried out to develop a method which permits removing detrimental organic chlorine compounds such as polychlorinated dibenzo-p-dioxins and polychlorinated dibenzofurans contained in a combustion waste gas discharged from an incinerator at a high efficiency and stably for a long period of time by means of a catalyst, without heating the combustion waste gas.

As a result, the following findings were obtained: By bringing organic chlorine compounds contained in a combustion waste gas into contact with a catalyst comprising at least one selected from the group consisting of platinum (Pt), palladium (Pd), ruthenium (Ru), manganese (Mn), copper (Cu), chromium (Cr) and iron (Fe) and oxides thereof, supported on the surface of a carrier containing at least titanium oxide ($TiO_2$), aluminum oxide ($Al_2O_3$) and silicon oxide ($SiO_2$) to cause a decomposition reaction of the organic chlorine compounds, it is possible to stably remove the organic chlorine compounds from the combustion waste gas at a high efficiency for a long period of time, without heating the combustion waste gas.

The present invention was made on the basis of the above-mentioned findings. Now, the method of the present invention is described below.

The catalyst used in the method of the present invention must comprise at least one selected from the group consisting of platinum, palladium, ruthenium, manganese, copper, chromium and iron and oxides thereof. This catalyst must furthermore be supported on the surface of a carrier containing at least titanium oxide ($TiO_2$), aluminum oxide ($Al_2O_3$) and silicon oxide ($SiO_2$).

A conventional carrier comprising, for example, aluminum oxide ($Al_2O_3$) is susceptible to oxidation by means of sulfur oxide and hydrogen chloride contained in a combustion waste gas at a temperature of up to 350° C. discharged from an incinerator. A catalyst supported on such a conventional carrier has therefore a relatively short service life.

The carrier in the present invention, which comprises at least titanium oxide ($TiO_2$), aluminum oxide ($Al_2O_3$) and silicon oxide ($SiO_2$), has a very high acid resistance. Even if the carrier contacts with a combustion waste gas at a temperature of up to 350° C., therefore, oxidation of the carrier caused by sulfur oxide and hydrogen chloride is prevented. As a result, the catalyst comprising at least one selected from the group consisting of platinum, palladium, ruthenium, manganese, copper, chromium and iron and oxides thereof, supported on such a carrier, has a long service life.

In addition, the carrier, which contains at least titanium oxide ($TiO_2$), aluminum oxide ($Al_2O_3$) and silicon oxide ($SiO_2$), is excellent in formability during the forming thereof. It is therefore easy to prepare a carrier having a geometrical structure and having a large surface area, such as a honeycomb structure in which a plurality of parallel through-holes are formed. Accordingly, activity of the catalyst of platinum, for example, supported on the carrier having such a large surface area is increased.

It is consequently possible to stably remove detrimental organic chlorine compounds such as polychlorinated dibenzo-p-dioxins and polychlorinated dibenzofurans from the combustion waste gas at a high efficiency for a long period of time, while avoiding oxidation of the carrier caused by sulfur oxide and hydrogen chloride contained in the combustion waste gas, without heating the combustion waste gas.

The carrier should preferably comprise a substrate comprising at least mullite ($3Al_2O_3.2SiO_2$) and a layer of titanium oxide ($TiO_2$), in an amount within a range of from 30 to 90 wt. % relative to the total amount of the carrier, formed on the surface of the substrate.

When the carrier has the above-mentioned structure, the layer of titanium oxide on the surface of the substrate comprising at least mullite ($3Al_2O_3.2SiO_2$) forms fine jogs on the surface of the carrier, thus increasing the surface area thereof. This increases activity of the catalyst of platinum, for example, supported on the carrier having such a large surface area. Presence of the above-mentioned layer of titanium oxide leads furthermore to an improved acid resistance of the carrier. It is therefore possible to stably remove the organic chlorine compounds from the combustion waste gas at a high efficiency for a long period of time without oxidation of the carrier caused by sulfur oxide and hydrogen chloride contained in the combustion waste gas.

The amount of the layer of titanium oxide formed on the surface of the substrate comprising at least mullite ($3Al_2O_3.2SiO_2$) should be within a range of from 30 to 90 wt. % relative to the total amount of the carrier. With an amount of the layer of titanium oxide of under 30 wt. % relative to the total amount of the carrier, it is impossible to form the layer of titanium oxide over the entire surface of the substrate comprising at least mullite ($3Al_2O_3.2SiO_2$), thus making it impossible to uniformly support the catalyst of platinum, for example, on the surface of the carrier and deteriorating acid resistance of the carrier.

With an amount of the layer of titanium oxide of over 90 wt. % relative to the total amount of the carrier, on the other hand, the layer of titanium oxide formed on the surface of the substrate comprising at least mullite ($3Al_2O_3.2SiO_2$) becomes thicker. This poses the problem that, for a honeycomb-shaped carrier, for example, the diameter of the through-holes becomes too small, thus easily causing clogging of the through-holes under the effect of adhesion of dust.

The temperature of the combustion waste gas to be brought into contact with the catalyst should be within a range of from 150° to 350° C. A temperature of the combustion waste gas of under 150° C. results in a lower removing efficiency of the organic chlorine compounds from the combustion waste gas, and in addition, the carrier may be oxidized by sulfur oxide and hydrogen chloride contained in the combustion waste gas.

With a temperature of the combustion waste gas of over 350° C., on the other hand, carbon monoxide and methane contained in the combustion waste gas burn on the catalyst, thus causing mutual welding of particles of the catalyst of platinum for example, supported on the surface of the carrier. This leads to a larger diameter of the particles of the catalyst on the surface of the carrier and hence to a smaller number of these particles. As a result, the total surface area of the particles of the catalyst of platinum supported on the surface of the carrier decreases, thus leading to a lower removing efficiency of the organic chlorine compounds from the combustion waste gas.

The above-mentioned temperature of the combustion waste gas within a range of from 150° to 350° C. is that after cooling the combustion waste gas discharged from the incinerator and then collecting dust contained therein by means of a dust collector. According to the present invention, therefore, it is not necessary to heat the combustion waste gas, so that equipment and running costs for heating the combustion waste gas are not required.

The space velocity of the combustion waste gas to be brought into contact with the catalyst should preferably be within a range of from 1,000 to 50,000 $h^{-1}$. A space velocity of over 50,000 $h^{-1}$ leads to a decreased removing efficiency of the organic chlorine compounds from the combustion waste gas. With a space velocity of under 1,000 $h^{-1}$, on the other hand, the removing efficiency of the organic chlorine compounds from the combustion waste gas is saturated, and in addition, the amount of the catalyst increased beyond the necessary level results in a higher catalyst cost.

The volume of the combustion waste gas passing through the catalyst should preferably be up to 250 $m^3$/hr. per $m^2$ of the catalyst surface area. A volume of the combustion waste gas of over 250 $m^3$/hr. per $m^2$ of the catalyst surface area leads to a decreased removing efficiency of the organic chlorine compounds from the combustion waste gas. The pressure of the combustion waste gas passing through the catalyst should preferably be within a range of from 0.1 to 10 $kg/cm^2$.

Figure 2:
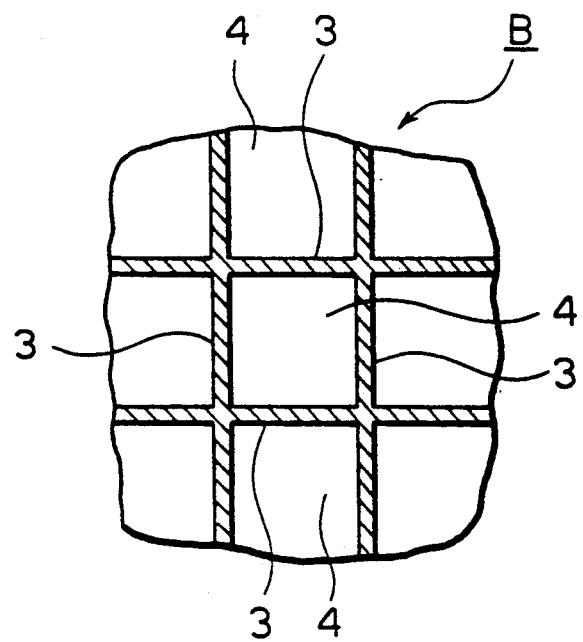
FIG. 2 is a schematic partial sectional view illustrating another carrier used in the method of the present invention.

The carrier may have any of shapes including a honeycomb shape, a pellet shape, a sheet shape and a hollow cylindrical shape. FIGS. 1 and 2 are partial sectional views illustrating embodiments of the carrier having the honeycomb structure. The carrier A shown in FIG. 1 has a honeycomb structure comprising a plurality of parallel sheet-shaped walls 1 arranged at prescribed intervals and corrugated walls 2 arranged between the plurality of sheet-shaped walls 1, and having a plurality of parallel through-holes 4. The carrier B shown in FIG. 2 has a honeycomb structure comprising a plurality of lattice-shaped walls 3 arranged at right angles to each other at prescribed intervals and having a plurality of parallel through-holes 4.

By forming the carrier into a honeycomb structure as shown in FIG. 1 or 2, and selecting an appropriate diameter of the through-holes 4 and an appropriate ratio of the total area of the through-holes 4 to the cross-sectional area of the carrier (hereinafter referred to as the "porosity"), it is possible to efficiently remove the organic chlorine compounds from the combustion waste gas under the effect of the catalyst of platinum, for example, supported on such a carrier, without causing clogging of the through-holes 4 resulting from adhesion of dust contained in the combustion waste gas and without increasing the pressure loss.

Each of the through-holes 4 of the carrier having the honeycomb structure should have a diameter of at least 2 mm, and the porosity of the carrier should be at least 50%. With a diameter of the through-holes 4 of under 2 mm, adhesion of dust contained in the combustion waste gas tends to easily cause clogging of the through-holes 4. A porosity of the carrier of under 50% leads to an increased pressure loss of the combustion waste gas and hence to a poorer removing efficiency of the organic chlorine compounds from the combustion waste gas under the effect of the platinum catalyst, for example, supported on such a carrier. An upper limit of the porosity is not particularly limited, but with a porosity of over 90%, the walls forming the honeycomb structure becomes too thin, thus tending to cause problems in wall strength.

Now, a typical method for manufacturing a carrier having a honeycomb structure is described. Silicon oxide ($SiO_2$) is added to, and mixed with, mullite ($3Al_2O_3.2SiO_2$) as a raw material. The resultant mixture is formed by means of the extrusion molding, for example, to prepare a formed body having a honeycomb structure as shown in FIG. 1 or 2. The thus prepared honeycomb-shaped formed body is fired at a high temperature of about 900° C. Thus, there is obtained a substrate comprising at least mullite ($3Al_2O_3.2SiO_2$), having a honeycomb structure, as shown in FIG. 1 or 2.

Then, the above-mentioned substrate is immersed into slurry-like titanium oxide ($TiO_2$) to cause adhesion of titanium oxide ($TiO_2$) layer onto the surface of the substrate. The substrate onto the surface of which titanium oxide ($TiO_2$) layer adheres is dried at a temperature of about 150° C., and then fired at a low temperature of about 400° C. Thus, there is prepared a carrier having a honeycomb structure, which comprises a substrate comprising at least mullite ($3Al_2O_3.2SiO_2$) and a layer of titanium oxide ($TiO_2$) formed on the surface of the substrate.

The thus prepared carrier is caused to support on the surface thereof a catalyst comprising at least one selected from the group consisting of platinum (Pt), palladium (Pd), ruthenium (Ru), manganese (Mn), copper (Cu), chromium (Cr) and iron (Fe) and oxides thereof. The catalyst supported on the carrier having the honeycomb structure is thus obtained.

Now, the method of the present invention is described further in detail by means of an example.

EXAMPLE

A carrier "A" having a honeycomb structure, as shown in FIG. 1, comprising a substrate comprising at least mullite ($3Al_2O_3.2SiO_2$) and a layer of titanium oxide ($TiO_2$), in an amount of 60 wt. % relative to the total amount of the carrier, formed on the surface of the substrate, was prepared. The carrier "A" had the following dimensions and porosity:

Distance "a" between sheet-shaped walls 1: 3.7 mm,
Pitch "b" between corrugations of corrugated walls 2: 7.5 mm,
Thickness "c" of corrugated walls 2: 0.4 mm,
Thickness "d" of sheet-shaped walls 1: 0.5 mm, and porosity: 77%.

The above-mentioned carrier "A" was caused to support a catalyst comprising platinum (Pt) in an amount of 2.5 g per 1,000 cm$^3$ of the volume of the carrier "A".

By means of the catalyst supported on the surface of the carrier "A", detrimental organic chlorine compounds such as polychlorinated dibenzo-p-dioxins (PCDDs) and polychlorinated dibenzofurans (PCDFs) were removed from a combustion waste gas discharged from a garbage incinerator.

Table 1 shows the temperature of the combustion waste gas, the space velocity (SV) of the combustion waste gas, and the removing ratios of polychlorinated dibenzo-p-dioxins (PCDDs) and polychlorinated dibenzofurans (PCDFs).

TABLE 1

| No. | Combustion waste gas Temperature (°C.) | SV (h$^{-1}$) | Removing ratio of PCDDS (%) | Removing ratio of PCDFs (%) |
|---|---|---|---|---|
| 1 | 200 | 1760 | 99.6 | 99.3 |
| 2 | 250 | 1760 | at least 99.9 | at least 99.9 |
| 3 | 300 | 1760 | at least 99.9 | at least 99.9 |
| 4 | 350 | 1760 | at least 99.9 | at least 99.9 |
| 5 | 200 | 2940 | 99.4 | 95.2 |
| 6 | 250 | 2940 | 99.8 | 98.7 |
| 7 | 300 | 2940 | 99.8 | 99.7 |
| 8 | 350 | 2940 | at least 99.9 | at least 99.9 |
| 9 | 200 | 3520 | 94.9 | 83.8 |
| 10 | 250 | 3520 | 98.4 | 96.1 |
| 11 | 300 | 3520 | 99.5 | 99.5 |
| 12 | 350 | 3520 | 99.8 | 99.6 |
| 13 | 200 | 4700 | 88.3 | 74.1 |
| 14 | 250 | 4700 | 96.8 | 92.9 |
| 15 | 300 | 4700 | 99.4 | 99.0 |
| 16 | 250 | 5880 | 88.3 | 74.8 |
| 17 | 300 | 5880 | 97.1 | 95.0 |
| 18 | 350 | 5880 | 97.7 | 97.17 |
| 19 | 250 | 9400 | 57.9 | 69.4 |
| 20 | 300 | 9400 | 90.8 | 86.8 |

According to the method of the present invention, as is clear from Table 1, detrimental organic chlorine compounds such as polychlorinated dibenzo-p-dioxins and polychlorinated dibenzofurans could be removed from the combustion waste gas discharged from the garbage incinerator at a very high efficiency and at a low temperature within a range of from 200 to 350° C., without heating the combustion waste gas.

According to the method of the present invention, as described above in detail, it is possible to provide a method which permits removing detrimental organic chlorine compounds such as polychlorinated dibenzo-p-dioxins and polychlorinated dibenzofurans contained in a combustion waste gas discharged from an incinerator at a high efficiency and stably for a long period of time by means of a catalyst without heating the combustion waste gas, thus providing industrially useful effects.

What is claimed is:

1. In a method for removing organic chlorine compounds from a combustion waste gas, which comprises the steps of:

bring organic chlorine compounds contained in a combustion waste gas at a temperature within a range of from 150° to 350° C. into contact with a catalyst comprising at least one selected from the group consisting of platinum (Pt), palladium (Pd), ruthenium (Ru), manganese (Mn), copper (Cu), chromium (Cr) and iron (Fe) and oxides thereof, and being supported on the surface of a carrier containing at least titanium oxide ($TiO_2$), aluminum oxide ($Al_2O_3$) and silicon oxide ($SiO_2$), to cause a decomposition reaction of said organic chlorine compounds, thereby removing said organic chlorine compounds from said combustion waste gas; the improvement, wherein:

said carrier comprises a substrate comprising at lest mullite ($3Al_2O_3 \cdot 2SiO_2$), and a layer of titanium oxide ($TiO_2$) formed on the surface of said substrate and covering the entire surface thereof, and an amount of said layer of titanium oxide ($TiO_2$) being within a range of from 30 to 90 wt. % relative to the total amount of said carrier.

2. A method as claimed in claim 1, wherein:
said carrier has a honeycomb structure in which a plurality of parallel through-holes are formed; said through-holes have a diameter of at least 2 mm; and the ratio of the total area of said through-holes relative to the cross-sectional area of said carrier is at least 50%.

3. A method as claimed in claim 1, wherein:
said carrier is pellet-shaped.

4. A method as claimed in claim 1, wherein:
said carrier is sheet-shaped.

5. A method as claimed in claim 1, wherein:
said carrier is cylindrical in shape.

6. A method as claimed in claim 1, wherein:
said combustion waste gas brought into contact with said catalyst has a space velocity within a range of from 1,000 to 50,000 $h^{-1}$.

7. A method as claimed in claim 2, wherein:
said combustion waste gas brought into contact with said catalyst has a space velocity within a range of from 1,000 to 50,000 $h^{-1}$.

8. A method as claimed in claim 3, wherein:
said combustion waste gas brought into contact with said catalyst has a space velocity within a range of from 1,000 to 50,000 $h^{-1}$.

9. A method as claimed in claim 4, wherein:
said combustion waste gas brought into contact with said catalyst has a space velocity within a range of from 1,000 to 50,000 $h^{-1}$.

10. A method as claimed in claim 5, wherein:
said combustion waste gas brought into contact with said catalyst has a space velocity within a range of from 1,000 to 50,000 $h^{-1}$.

11. A method as claimed in claim 1, wherein:
said combustion waste gas has a volume of up to 250 $m^3$/hour.

12. A method as claimed in claim 1, wherein:
said combustion waste gas is at a pressure of 0.1 to 10 $kg/cm^2$.

13. A method as claimed in claim 1, wherein:
said carrier has a porosity of 50% to 90%.

14. A method as claimed in claim 7, wherein:
said combustion waste gas has a volume of up to 250 $m^3$/hour and is at a pressure of 0.1 to 10 $kg/cm^2$.

15. A method as claimed in claim 8, wherein:
said combustion waste gas has a volume of up to 250 $m^3$/hour and is at a pressure of 0.1 to 10 $kg/cm^2$.

16. A method as claimed in claim 9, wherein:
said combustion waste gas has a volume of up to 250 $m^3$/hour and is at a pressure of 0.1 to 1 $kg/cm^2$.

17. A method as claimed in claim 10, wherein:
said combustion waste gas has a volume of up to 250 $m^3$/hour and is at a pressure of 0.1 to 10 $kg/cm^2$.

* * * * *